(12) United States Patent
Eng et al.

(10) Patent No.: US 11,579,439 B2
(45) Date of Patent: Feb. 14, 2023

(54) MEMS BASED SPECTRAL SHAPER USING A BROADBAND SOURCE

(71) Applicant: SILICON LIGHT MACHINES CORPORATION, Sunnyvale, CA (US)

(72) Inventors: Lars Eng, Los Altos, CA (US); Alexander Payne, Ben Lomond, CA (US); Daniel Eng, Los Altos, CA (US); Satoshi Yamashita, Kyoto (JP)

(73) Assignee: SILICON LIGHT MACHINES CORPORATION, San Jose, CA (US)

( * ) Notice: Subject to any disclaimer, the term of this patent is extended or adjusted under 35 U.S.C. 154(b) by 408 days.

(21) Appl. No.: 16/878,540

(22) Filed: May 19, 2020

(65) Prior Publication Data

US 2020/0371344 A1 Nov. 26, 2020

Related U.S. Application Data

(60) Provisional application No. 62/850,476, filed on May 20, 2019.

(51) Int. Cl.
*G02B 26/08* (2006.01)
*G02B 5/18* (2006.01)
(Continued)

(52) U.S. Cl.
CPC ........ *G02B 26/0841* (2013.01); *G01J 3/0229* (2013.01); *G02B 5/1814* (2013.01); *G02B 27/30* (2013.01); *G02B 27/16* (2013.01)

(58) Field of Classification Search
CPC .. G02B 26/0841; G02B 5/1814; G02B 27/30; G02B 27/16; G02B 5/1861; G02B 26/06; G02B 26/007; G01J 3/0229; G01J 2003/1213; G01J 3/021; G01J 2003/1286; G01J 3/12; G01J 3/18
See application file for complete search history.

(56) References Cited

U.S. PATENT DOCUMENTS 6,141,361 A * 10/2000 Mears ..................... G02F 1/292
372/98
2002/0176149 A1* 11/2002 Davis ................. G02B 27/1006
359/290

(Continued)

OTHER PUBLICATIONS

International Search Report for International Application PCT/US20/33745 dated May 20, 2020.

(Continued)

*Primary Examiner* — Robert E. Tallman
(74) *Attorney, Agent, or Firm* — William Nuttle

(57) ABSTRACT

A system and method are provided for spectral shaping of light from a broadband source using a linear spatial light modulator (SLM). The system includes an illumination source generating light including a plurality of wavelengths, a lens to collimate the light and an aperture to define its angular spread, a diffraction grating to disperse the beam by wavelength, and a focusing element to focus the dispersed beams from the diffraction grating onto a plurality of pixels of the SLM. The SLM is configured to individually modulate the dispersed beams by diffracting light output therefrom into higher orders, where a diffraction angle of output light is greater than an input cone angle of incoming light from the illumination source.

20 Claims, 17 Drawing Sheets

(51) Int. Cl.
　　　*G02B 27/30*　　　(2006.01)
　　　*G01J 3/02*　　　(2006.01)
　　　*G02B 27/16*　　　(2006.01)

(56) References Cited

U.S. PATENT DOCUMENTS

2008/0084605 A1　4/2008　Rothenberg et al.
2011/0051216 A1　3/2011　Mackinnon et al.
2018/0087931 A1　3/2018　Laman

OTHER PUBLICATIONS

Written Opinion of International Searching Authority Application PCT/US20/33745 dated May 20, 2020.

* cited by examiner

MEMS BASED SPECTRAL SHAPER USING A BROADBAND SOURCE

CROSS-REFERENCE TO RELATED APPLICATIONS

This application claims the benefit of priority under 35 U.S.C. 119(e) to U.S. Provisional Patent Application Ser. No. 62/850,476, filed May 20, 2019, which is incorporated by reference herein in its entirety.

TECHNICAL FIELD

This disclosure relates generally relates to systems and methods for spectral shaping, and more particularly to in systems and methods for spectral shaping of a general purpose broadband source using microelectromechanical systems (MEMS) based diffractive spatial light modulators.

BACKGROUND

Microelectromechanical systems (MEMS) based spatial light modulators (SLMs) have been used to shape the spectrum of light sources in a number of applications including telecommunications systems to equalize the spectrum of an erbium-doped fiber amplifier, simulating the solar spectrum for testing photovoltaics and sensors, and in medical apparatus, such as Optical Coherence Tomography (OCT) systems to provide a spectrum appropriate for eye diagnostics. Typically, these applications require expensive coherent light sources, such as a laser, to work efficiently with the SLM due to a small active area of conventional MEMS based SLMs.

Accordingly, there is a need for spectral shaping systems and methods using a MEMS-based SLM and a low cost general purpose broadband light source.

SUMMARY

Systems and methods are provided for spectrally shaping light from a broadband source using a linear spatial light modulator (SLM).

In one embodiment, the system includes a broadband light source generating light at a plurality of wavelengths, a lens to collimate it and an aperture to limit its numerical aperture, a diffraction grating to spatially disperse the beam by wavelength, a lens to focus the dispersed light onto the SLM whereby individual wavelengths can be individually and arbitrarily attenuated, and whereby same lens is used to collect and re-collimate the attenuated beams by passing back through the diffraction grating.

In one embodiment, each of the plurality of pixels of the linear SLM comprises one or more two dimensional (2D) microelectromechanical systems (MEMS) based diffractive modulators.

In another aspect, the method involves generating light including a plurality of wavelengths, collimating the light, dispersing the collimated light into a number of dispersed beams separated by wavelength and focusing the number of dispersed beams onto a plurality of pixels of a SLM. Each pixel of the SLM is individually controlled to individually modulate or attenuate a number of the dispersed beams by diffracting light output from the SLM into higher orders. A diffraction angle of light output from the SLM is greater than an acceptance angle of light incident thereon to provide improved contrast and efficiency. Generally, the method further includes recombining the light output from the SLM into a collimated output beam comprising desired wavelengths, and optically coupling a portion of the collimated output beam to an input of a spectrometer, which is used to control the SLM in a closed-loop feedback mode.

BRIEF DESCRIPTION OF THE DRAWINGS

Embodiments of the invention will now be described, by way of example only, with reference to the accompanying schematic drawings in which corresponding reference symbols indicate corresponding parts. Further, the accompanying drawings, which are incorporated herein and form part of the specification, illustrate embodiments of the present invention, and, together with the description, further serve to explain the principles of the invention and to enable a person skilled in the relevant art(s) to make and use the invention.

Figure 1A:
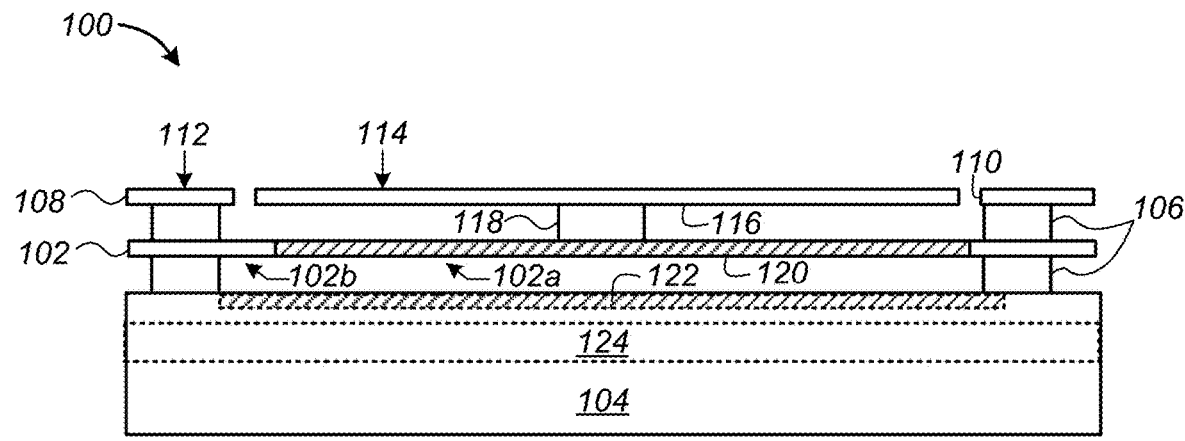
FIG. 1A is a schematic block diagram of a sectional side view of a single or individual two-dimensional (2D) Microelectromechanical System (MEMS) based modulator in a quiescent or undriven state.

The features and advantages of embodiments of the present invention will become more apparent from the detailed description set forth below when taken in conjunction with the drawings. In the drawings, like reference numbers generally indicate identical, functionally similar, and/or structurally similar elements.

DETAILED DESCRIPTION

Embodiments of systems and methods for spectrally shaping light from a broadband source using a linear spatial light modulator (SLM) including a plurality of individually controlled pixels and having a large optical area. In a number of embodiments, each of the plurality of pixels includes one or more two dimensional (2D) microelectromechanical systems (MEMS) based diffractive modulators.

In the following description, numerous specific details are set forth, such as specific materials, dimensions and processes parameters etc. to provide a thorough understanding of the present invention. However, particular embodiments may be practiced without one or more of these specific details, or in combination with other known methods, materials, and apparatuses. In other instances, well-known semiconductor design and fabrication techniques have not been described in particular detail to avoid unnecessarily obscuring the present invention. Reference throughout this specification to "an embodiment" means that a particular feature, structure, material, or characteristic described in connection with the embodiment is included in at least one embodiment of the invention. Thus, the appearances of the phrase "in an embodiment" in various places throughout this specification are not necessarily referring to the same embodiment of the invention. Furthermore, the particular features, structures, materials, or characteristics may be combined in any suitable manner in one or more embodiments.

The terms "over," "under," "between," and "on" as used herein refer to a relative position of one layer with respect to other layers. As such, for example, one layer deposited or disposed over or under another layer may be directly in contact with the other layer or may have one or more intervening layers. Moreover, one layer deposited or disposed between layers may be directly in contact with the layers or may have one or more intervening layers. In contrast, a first layer "on" a second layer is in contact with that second layer. Additionally, the relative position of one layer with respect to other layers is provided assuming operations deposit, modify and remove films relative to a starting substrate without consideration of the absolute orientation of the substrate.

Figure 1B:
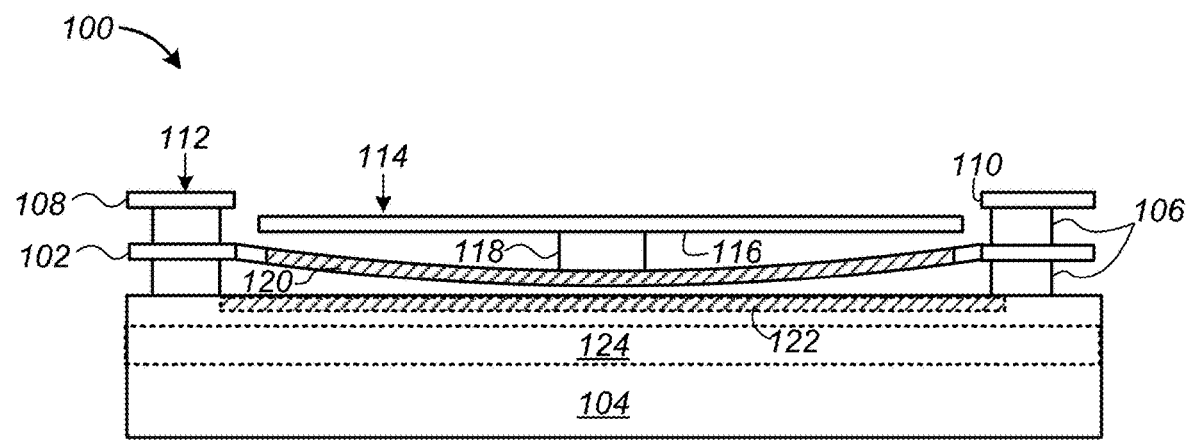
FIG. 1B is a schematic block diagram of a sectional side view of the portion of the modulator of FIG. 1A in an active or driven state.
Figure 1C:
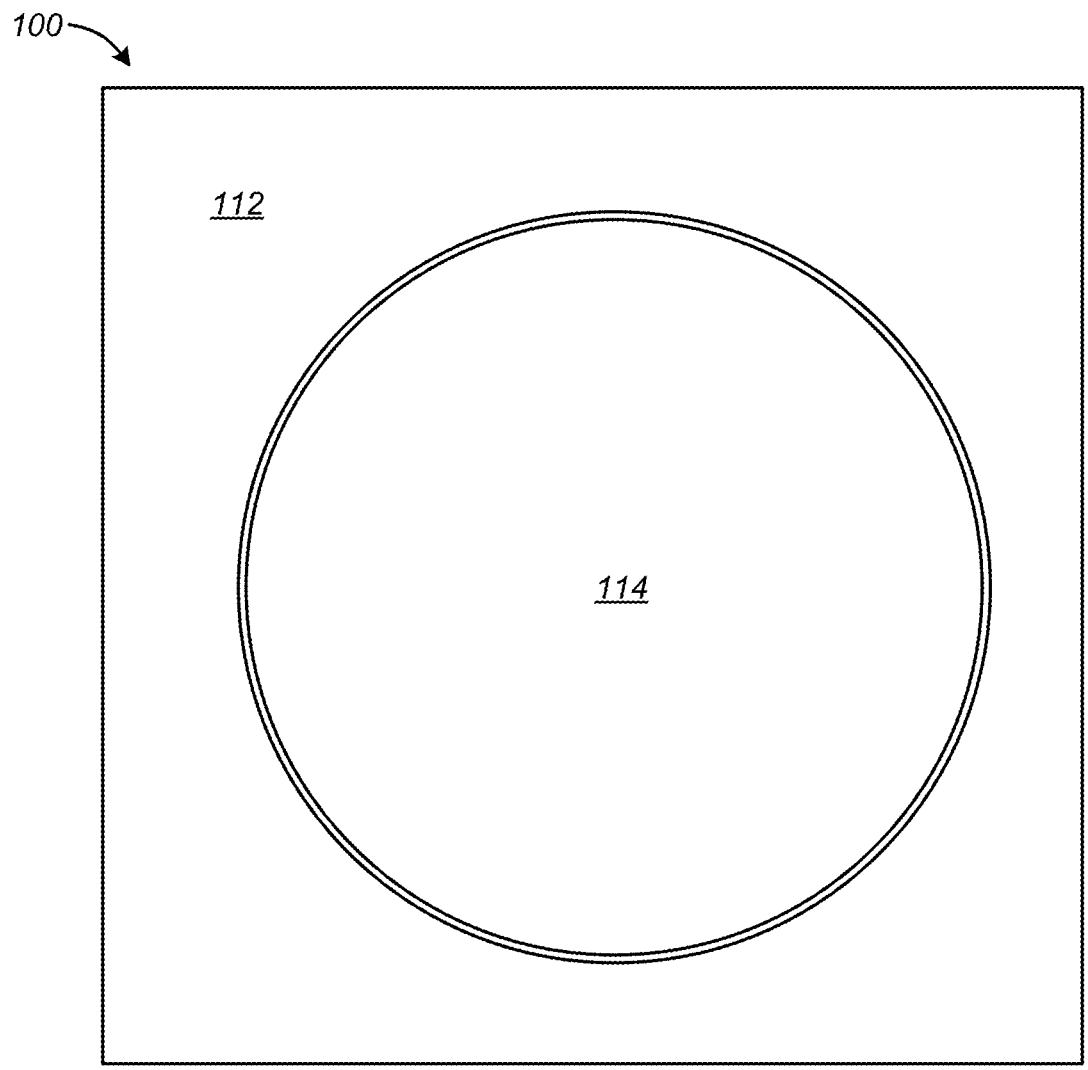
FIG. 1C is a top view of the modulator of FIG. 1A illustrating the static light reflective surface and the movable light reflective surface.

An embodiment of a two-dimensional (2D) microelectromechanical system (MEMS) based, modulator, known as a Planar Light Valve (PLV™) commercially available from Silicon Light Machines, Inc., of Sunnyvale, Calif., which is particularly advantageous for use in and with spectral shaping systems and methods of the present disclosure is shown in FIGS. 1A through 1C.

For purposes of clarity, many of the details of fabricating and operating 2D MEMS-based, modulators, which are widely known and not relevant to the present invention, have been omitted from the following description. 2D MEMS-based, modulators are described, for example, in commonly assigned U.S. Pat. No. 7,064,883, entitled, "Two-Dimensional Spatial Light Modulator," by Alexander Payne et al., issued on Jun. 20, 2006, and incorporated herein by reference in its entirety.

FIG. 1A illustrates a schematic block diagram of a sectional side view of the 2D MEMS-based modulator in a quiescent or undriven state. Referring to FIG. 1A, the MEMS-based optical modulator 100 generally includes a piston layer 102 suspended over a surface of a substrate 104 by posts 106 at corners of the piston layer and/or modulator. The piston layer 102 includes an electrostatically deflectable piston 102a and a number of flexures 102b through which the piston is flexibly or movably coupled to the posts. A faceplate includes both a static portion 108 and a closed cut 110 which separates it from a moving portion 114 attached to the piston flexure 102a. The modulator 100 further includes a first light reflective surface 112 on a top surface of the faceplate 108, and a second reflective surface 114 over the a top surface of the piston 102a. The second light reflective surface 114 can either be formed directly on the top surface of the piston 102a, or, as in the embodiment shown, on a mirror 116 supported above and separated from the piston 102a by a central post 118 extending from the piston to the mirror. The first and second light reflective surfaces 112, 114, have equal area and reflectivity so that in operation electrostatic deflection of the piston 102a caused by an electrode 120 formed in or on the piston layer 102 and an electrode 122 in the substrate 104 brings light reflected from the first light reflective surface into constructive or destructive interference with light reflected from the second light reflective surface.

Generally, the electrode 122 in the substrate 104 is coupled to one of a number drive channels (not shown in this figure) in a drive circuit or driver 124, which can be integrally formed in the substrate adjacent to or underlying the modulator 100, as in the embodiment shown. As explained in greater detail below, typically multiple individual modulators are grouped or ganged together under control of a single drive channel to function as a single pixel in an array of a linear SLM.

FIG. 1B is a schematic block diagram of the modulator 100 of FIG. 1A in an active or driven state, showing the piston 102a deflected towards the substrate 104, and FIG. 1C is a top view of the modulator of FIGS. 1A and 1B illustrating the static first light reflective surface 112 and the movable second light reflective surface 114.

Figure 2:
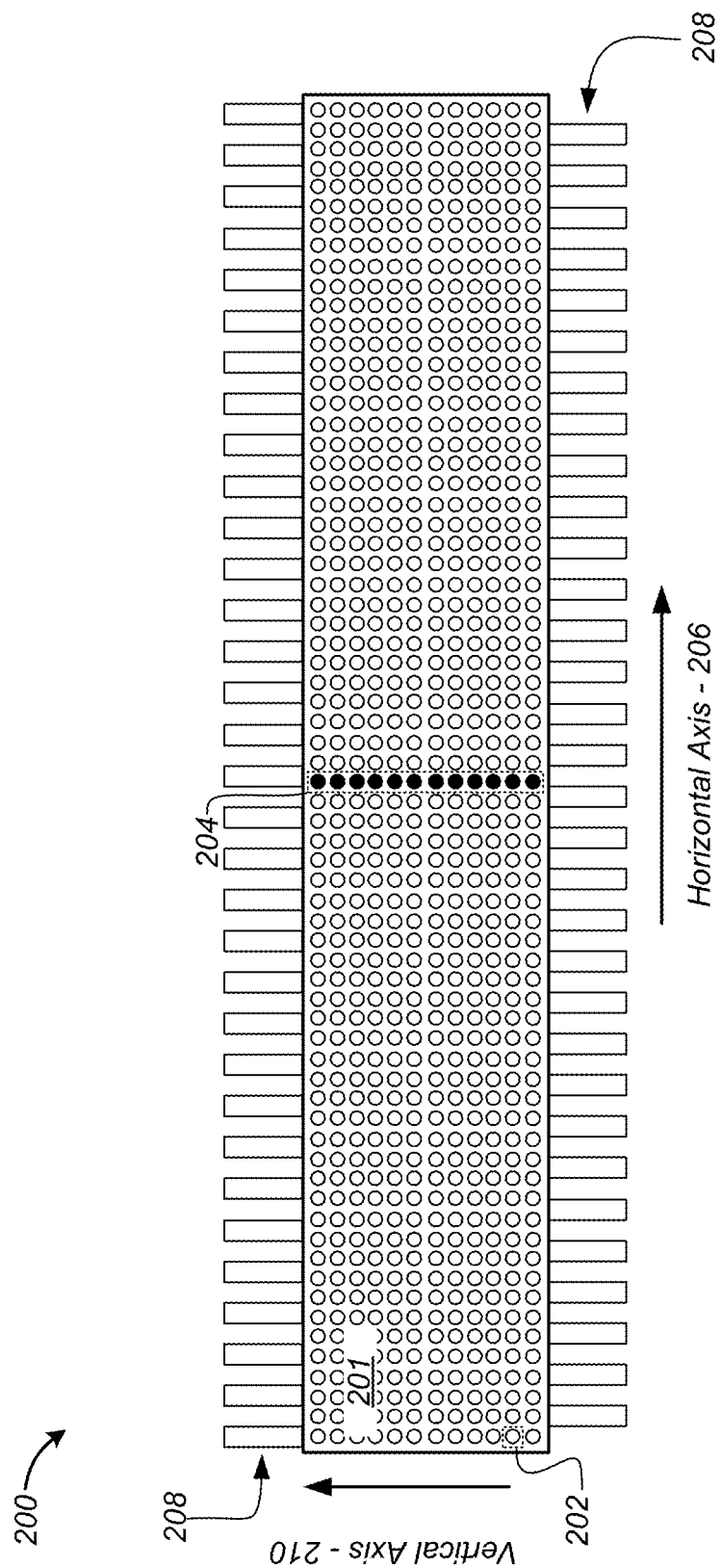
FIG. 2 is a block diagram of a top view of linear spatial light modulator (SLM) including an array of 2D MEMS based modulators, such as those shown in FIGS. 1A-C, grouped or coupled together into a number of drive channels to form a number of pixels according to an embodiment of the present disclosure.

An exemplary linear SLM including an array of dense-packed, 2D modulators will now be described with reference to the block diagram of FIG. 2. FIG. 2 is a planar top view of an linear SLM 200 including an array 201 of 2D modulators 202, such as those shown in FIGS. 1A-C, grouped or coupled together to a number of drive channels to form a number of pixels.

Referring to FIG. 2, in one embodiment the 2D modulators 202 are grouped into an array 201 of interleaved channels or pixels 204 along a first, horizontal or longitudinal axis 206. Each of the 2D modulators 202 in a single pixel 204 share a common drive channel or driver 208. Although in the embodiment shown each pixel 204 is depicted as having a single column of 12 modulators grouped along a transverse or vertical or transverse axis 210 perpendicular to the horizontal or longitudinal axis 206 of the array, this is merely to facilitate illustration of the array. It will be appreciated that each channel or pixel can include any number of 2D modulators arranged in one or more columns of any length across the width or vertical or transverse axis of the array without departing from the spirit and scope of the invention. For example, in one embodiment of the linear SLM 200 particularly suited for the spectral shaping systems and methods of the present disclosure, each pixel 204 includes a single column of 40 modulators grouped along the transverse axis 210 of the array. Similarly, the linear SLM 200 can include an array 201 of any number of pixels 204 or a number of individual arrays 201 placed end to end adjacent to one another. This later configuration can help to increase power handling of a linear SLM 200 as the optically active area of the array 201 gets larger by increasing the number of columns of modulators per pixel. If the damage threshold per modulator is constant, power handling can be increased proportional to the area increase.

In order to maximize or provide sufficient contrast for the linear SLM 200 it is desirable that incident light from an illumination source, have a numerical aperture (NA) or cone angle ($\Theta$) which is smaller than the first-order diffraction angle ($\theta$) of the diffractive SLM 202. The diffraction angle ($\theta$) of the SLM is defined as the angle between light reflected from a pixel 204 in the $0^{th}$ order mode or state, and light reflected from the same pixel in the plus and/or minus $1^{st}$ order mode. However, according to the grating equation, diffraction angles of a periodic surface, such as the array 201 of the linear SLM 200, are set by a ratio of wavelength of light incident on the array to a spatial period or pitch of features of the periodic surface, i.e., the pixels 204. In particular, the grating equation states:

$$\sin \theta = m\lambda/\Lambda$$

where $\theta$ is a diffraction angle of light reflected from the surface, m is order of diffracted ray (integer), $\lambda$ is the wavelength of the incident light, and $\Lambda$ is a spatial or pitch of the modulator 202. When we focus on a single pixel which has multiple modulators 202 and the incident light is ideal plane wave or NA=0, the light spreads due to Huygen-Fresnel principle. The spreading angle $\Theta$ is defined:

$$\Theta = \lambda/D$$

where D is a pixel size.

Achieving adequate contrast with conventional grating based SLMs requires either limiting illumination NA by means of an aperture (and suffering the associated throughput loss), or providing a large diffraction angle by reducing the size and spatial period or pitch of the individual modulators. However, this latter approach is problematic for a number of reasons including the need for larger, higher voltage drive circuits to drive smaller, movable grating elements, and a reduction of an optical power handling capability of the SLM resulting from such smaller grating elements.

In contrast to conventional grating based SLMs, a linear SLM 200 including 2D MEMS-based modulators 202, such as a Linear Planar Light Valve (PLV™) commercially available from Silicon Light Machines, Inc., of Sunnyvale, Calif., is configured to have multiple pixels 204 each pixel including several modulators 202 arranged along the transverse or vertical axis 210 of the array (twelve in the embodiment shown), but with a much smaller number, generally only one or two modulators, arranged along the horizontal or longitudinal axis 206. Because of this, the spreading angle $\Theta_H$ of diffracted light from the pixel 204 along the longitudinal axis, where the pixel size is much smaller than along the vertical or transverse or transverse axis, is much larger than the spreading angle $\Theta_V$ of the pixel along the transverse axis. Conversely, the numerical aperture of illumination in the vertical direction (array short axis) can be much larger than the numerical aperture in the horizontal direction (array long axis) since the latter is limited by the diffraction angle of the SLM in order to achieve sufficient contrast. Thus by using a linear array of 2D modulators in combination with an asymmetric illumination NA in the longitudinal and transverse directions, the overall throughput of the spectral shaper can be improved.

Figure 3A:
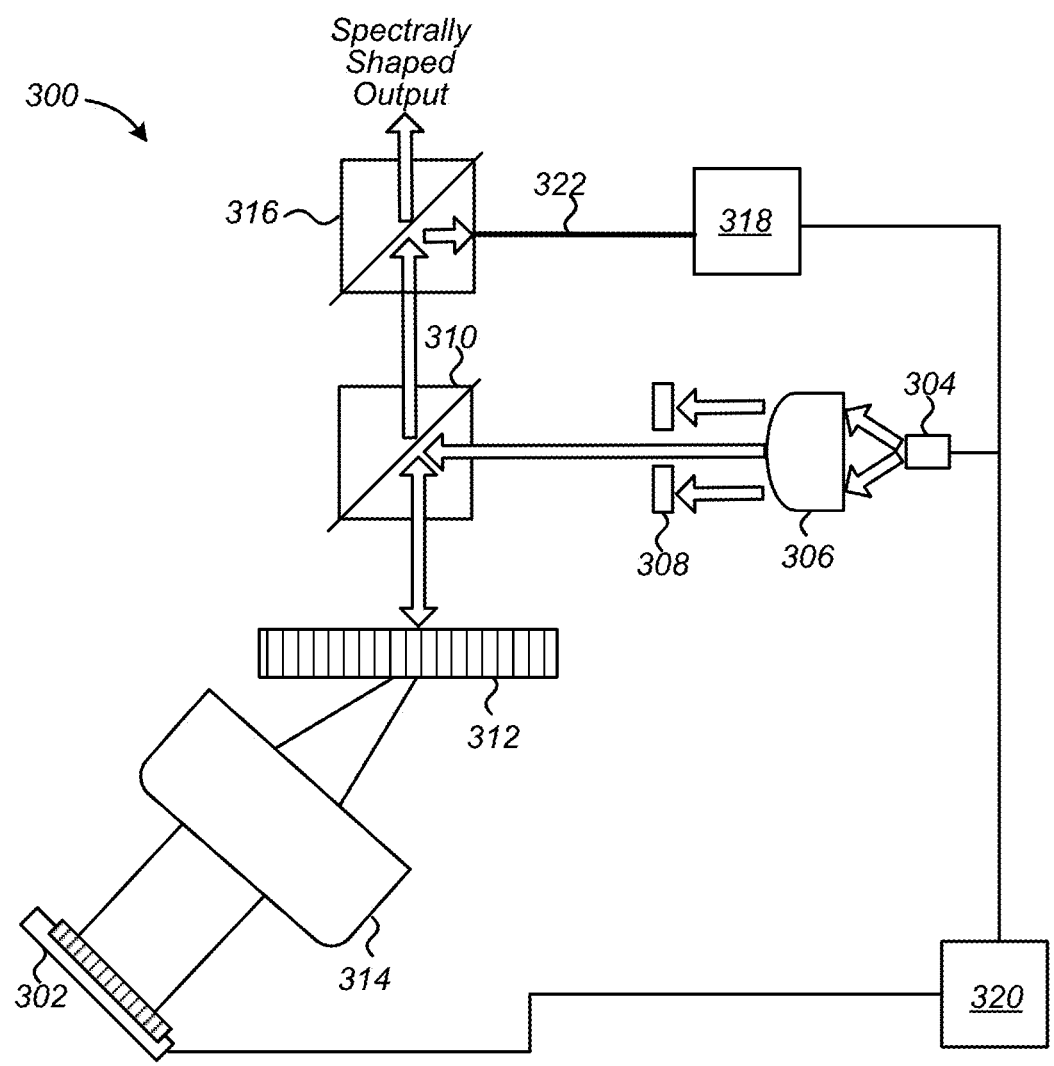
FIG. 3A is a block diagram depicting a system for spectral shaping light from a broadband source using a linear SLM according to an embodiment of the present disclosure, and illustrating light paths in an x direction.
Figure 3B:
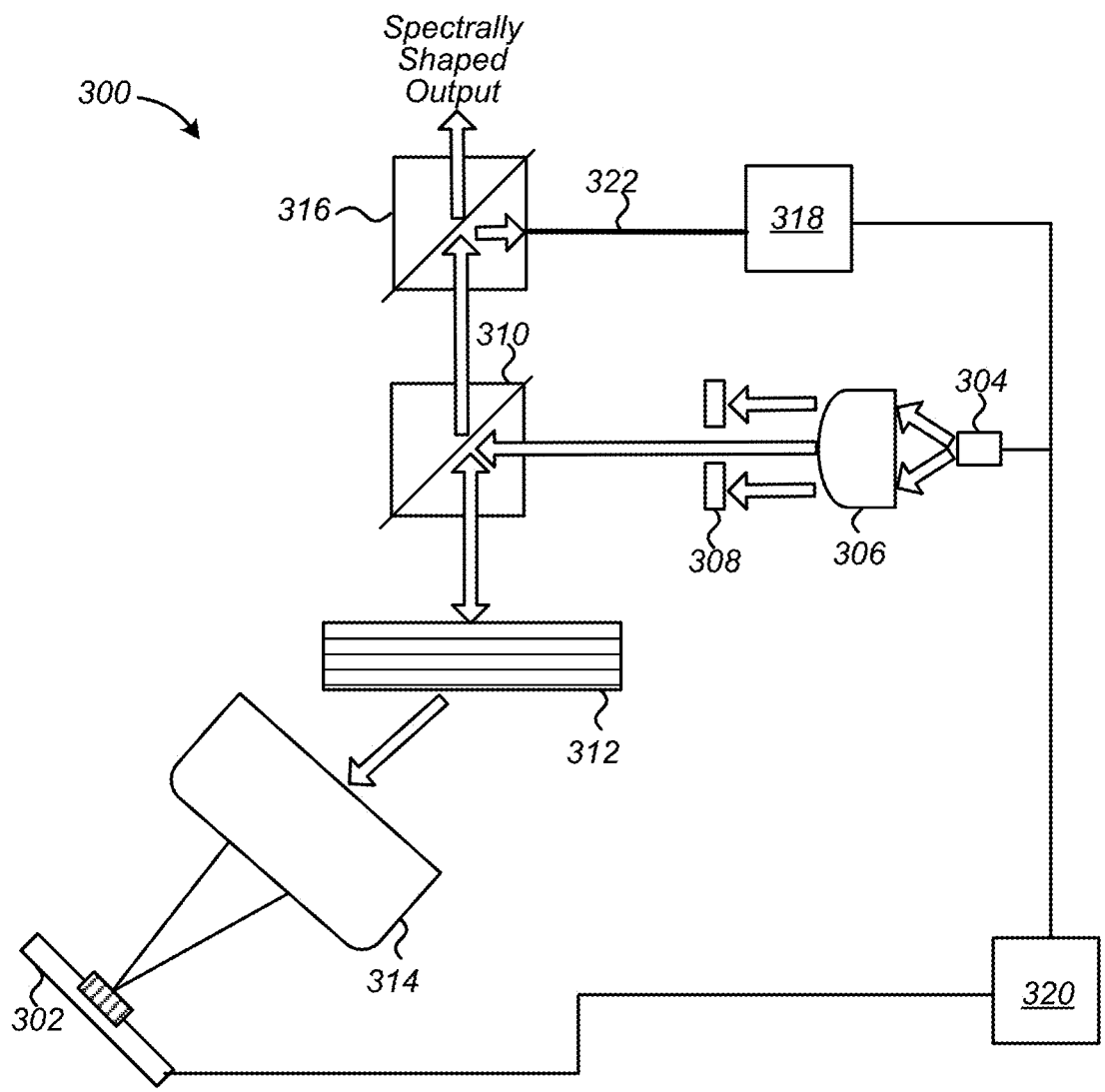
FIG. 3B is a block diagram depicting the system of FIG. 3A, illustrating light paths in any direction.

Exemplary embodiments of a spectral shaping system for spectrally shaping light from a general purpose, broadband source using a linear SLM, such as the linear SLM, including 2D MEMS-based modulators will now be described with reference to FIGS. 3A and 3B. FIG. 3A is a block diagram depicting a spectral shaper using a broadband source and the linear SLM, and illustrating light paths in a first direction in an x, z plane. FIG. 3B is a block diagram depicting the system of FIG. 3A, illustrating light paths in a second direction perpendicular to the first in a y, z plane. In addition to a linear SLM 302, the spectral shaping system or shaper 300 generally further includes a broadband, illumination source 304 capable of generating light including a plurality of wavelengths. Suitable illumination sources 304 can include a supercontinuum laser or lasers capable of producing from one watt (W) to over a kilowatt (kW) output power, or, in some embodiments, one or more low coherence, low cost, light emitting diodes (LEDs) of different wavelengths coupled or multiplexed together to form a broadband source. The system described here is particularly suited to an illumination source 304 including multiple LED light sources. A lens 306 collimates light from the illumination source 304. Note that this lens may be aspheric to provide different power in x and y azimuths. Aperture 308 is used to limit the numerical aperture (NA). Generally, the aperture 308 is a circular aperture having a diameter of between 1-5 mm, but in some embodiments may be a variable aperture having a diameter of ≥2.5 mm, or a non-circular aperture having a different size in x and y azimuths. An optical collecting element, shown here as a beam splitter 310, directs a portion of the collimated beam to a static, diffraction grating 312. Although shown here as a beam splitter 310, it will be understood that the optical collecting element can alternatively include one or more lenses, prisms or mirrors, configured to collect and direct light to and from the diffraction grating 312.

The diffraction grating 312 receives the collimated beam from the beam splitter and disperses it into a number of dispersed beams separated by wavelength. In the embodiment shown, diffraction grating 312 uses the $1^{st}$ order of light from the diffraction grating, with the center of this spectrum parallel to normal of linear SLM 302. The spread light is then collimated in the x direction, focused in they direction (as shown in FIG. 3B) by the focusing element 314. This spreads light in a line across the pixels of the linear SLM 302 according to wavelength, which can in turn be greyscale attenuated by wavelength for the desired $0^{th}$ order output spectrum. The linear SLM 302 attenuates the $0^{th}$ order beam by diffracting light into higher orders. In preferred embodiment, the linear SLM 302 is a Linear PLV™ and is configured to individually attenuate a number of the plurality of wavelengths of the dispersed beams. The output light then passes back through the focusing element 314 and diffraction grating 312. The diffraction grating 312, the focusing element 314, and the linear SLM 302 are each 150 mm away from one another. When the light passes back through the diffraction grating 312, the wavelengths are recombined. This recombined and modulated or attenuated light then passes through the beam splitter 310 to provide a spectrally shaped, collimated output.

Optionally, the spectral shaping system 300 further includes a second optical collecting element, such as a second beam splitter 316, an optical spectrometer 318 and a controller 320. The second beam splitter 316 is configured to pass at least a portion of the collimated output beam to the optical spectrometer 318. The optical spectrometer 318 is configured to sample the portion of the collimated output beam, and to generate data on wavelengths and power of the collimated output beam, which is then used by the controller 320 to control the linear SLM 302, and, in some embodiments, the illumination source 304, in a closed-loop manner to provide a user selected spectrally shaped, collimated output at a selected power level or optical intensity. The controller 320 can include a microprocessor in the spectral shaping system 300 or a separate, general purpose computer in or coupled to a system or tool and using the spectral shaping system, such as a 3D printing system. Alternatively, the controller 320 can include logic and memory circuits integrally formed with drivers for the linear SLM 302 on a shared substrate with the array (not shown in these figures) of the linear SLM, or packaged in a shared integrated circuit (IC) package or mounted to a shared printed circuit board (PCB).

In one embodiment, the spectrometer 318 is optically coupled to an output of the second beam splitter 316 through an optic fiber 322 as in the embodiment shown. Preferably, the optic fiber 322 is configured or positioned at a Fourier plane so different orders that were recombined at the diffraction grating 312 are visible above and below the desired $0^{th}$ order light. Alternatively, the spectral shaping system 300 can further include a lens (not shown) between the second beam splitter 316 and an input to the spectrometer 318 to filter out higher orders.

Reducing the incoming angle to the linear SLM has been discovered to increase the contrast ratio with this LED and linear SLM. A similar increase of contrast would be seen if the pitch of the grating were to be tightened.

The contrast ratio (CR) of the spectral shaper 300 is limited by a pitch of the modulators in the linear SLM, which at larger values is unable to completely separate the $0^{th}$ and $1^{st}$ orders of light returning from the linear SLM. The NA of the linear SLM should be equal or larger than NA of the light source. More specifically, the LPLV's 1st order angle ($\theta_{1st}$) should be equal to or larger than the full illumination angle ($2\theta$in)

$$\theta_{1st} = [(\lambda)]\_lowest/pitch \geq 2\theta in$$

where $$\theta_{in} = \frac{\text{radius aperture}}{f_{focusing\ lens}}$$

Figure 14:
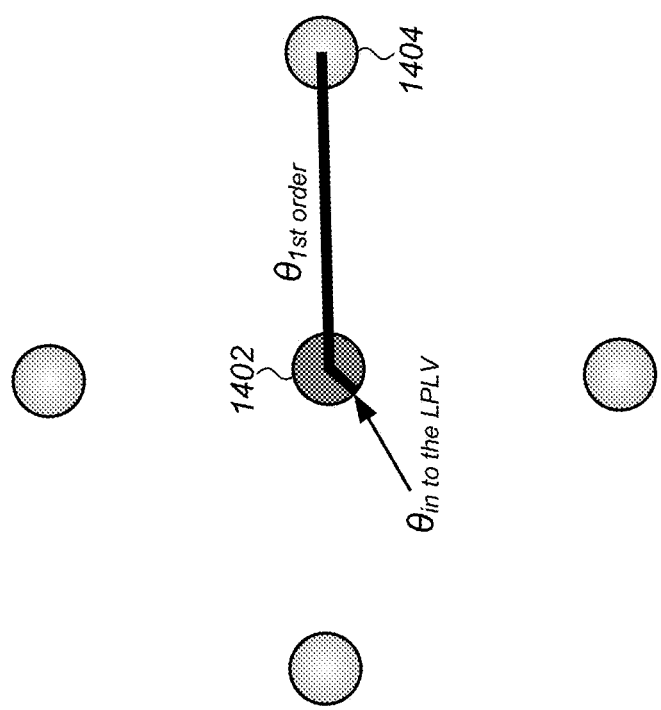
FIG. 14 is schematic block diagram showing complete separation between $0^{th}$ and $1^{st}$ orders from a linear SLM according to an embodiment of the present disclosure illuminated by a collimated laser.
Figure 15:
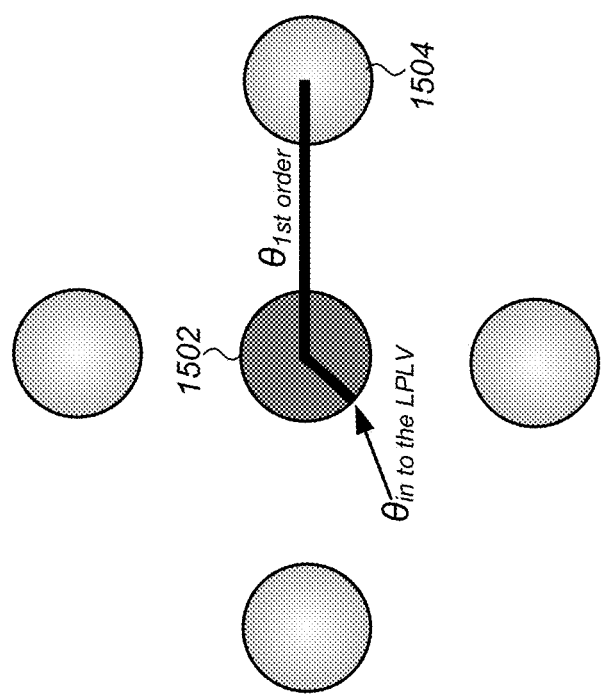
FIG. 15 is a schematic block diagram showing separation between $0^{th}$ and $1^{st}$ orders from a SLM according to an embodiment of the present disclosure illuminated by a non-expanded (low NA) beam.

Thus, for a greater 1st order diffraction spread and greater separation of orders, a tighter or smaller pitched linear SLM and/or a system having a lower incoming NA is preferred. This will result in the 1st order cones of each wavelength being entirely non-overlapping with the 0th order (as shown in FIGS. 14 and 15 and explained in detail below).

Solutions to changing the $\theta_{in}$ of a spectral shaper typically involve either a smaller aperture after the collimated beam (which would reduce the total power of the system) or a higher NA lens to collimate the beam, resulting in a smaller beam, both of which result in a smaller beam radius. However, with the 2D MEMS-based SLM of the present disclosure this can be accomplished by tightening the pitch of the linear SLM to produce a broader or greater distinction between orders, thus enabling the various 1st order wavelengths to be mapped to different locations in the Fourier plane. So long as the NA of the output of linear SLM is high or the NA input into linear SLM is low, the 0th and 1st orders will not overlap, and the 1st order wavelengths are separated out, resulting in a higher contrast ratio (CR). In the embodiment shown in FIGS. 3A and 3B, for a focusing element 314 focusing element with a f=150 mm and input beam radius 3 mm, the linear SLM should have a pitch of about 12.5 microns to completely separate out the orders of light having wavelengths at a low end (500 nm), where $\theta_{in}$=(radius aperture)/f_(focusing lens).

By reducing the radius of the aperture after the collimating lens, the incoming angle to the linear SLM is reduced, thereby increasing CR. The tradeoff, however, is lower light through the system as more power is lost to the aperture. FIG. 2 shows the tradeoff between intensity in counts and CR for this LED and LPLV combination.

Increasing the focal length of the focusing element 314 (f (focusing lens) in the equation above) could also reduce $\theta_{in}$, however this effect would reach a limit as the longer the focal length, the larger the smallest possible focus would be. Keeping the same collimating optic (f=50 mm aspheric lens) and increasing the focal length, will provide higher magnification at the image plane of the LPLV.

$$|M|=f\_(\text{focusing lens})/f\_(\text{collimating lens})$$

The embodiment of FIGS. 3A and 3B has a magnification of about 3, with focal lengths 150 mm for the focusing element 314 and 50 mm for the aspheric collimating lens 306. If the focal length of the focusing element onto the linear SLM 302 (focusing element 314) exceeds about 150 mm, there will be overfilling of the array of the linear SLM, which will result in static reflections that are not a result of $0^{th}$ order diffraction, degrading the contrast ratio (CR) of the spectral shaper 300. A further reason not to increase this focal length is to maintain a practical optical length for a reasonably sized system. Thus, controlling the size of the incoming collimated beam has been found to be a better way to reduce an incoming angle to the linear SLM.

Figure 4:
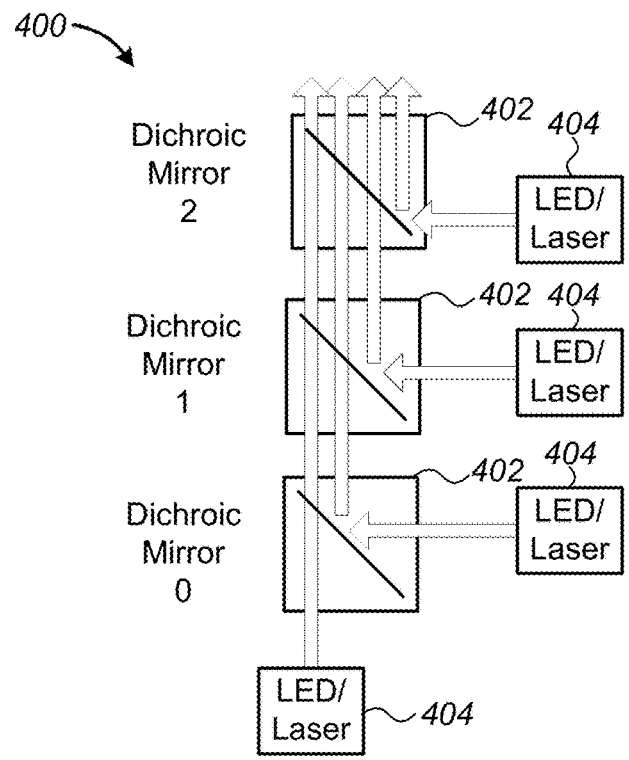
FIG. 4 is a block diagram depicting an embodiment of an illumination source according to an embodiment of the present disclosure and combining outputs of multiple, discrete emitters, each generating light at one or more different wavelengths.

While the embodiments of systems for spectral shaping described above illustrated the illumination source as including a single source, such as a broad spectrum laser or LED, the output of several broadband emitters such as lasers or LEDs, can be combined to create a concentric, collimated input beam with a desired spectral width and/or power. FIG. 4 is a block diagram depicting an embodiment of one such illumination source 400 including a series of dichroic mirrors 402 to combining outputs of multiple, discrete emitters 404, each generating light at one or more different wavelengths.

Figure 5:
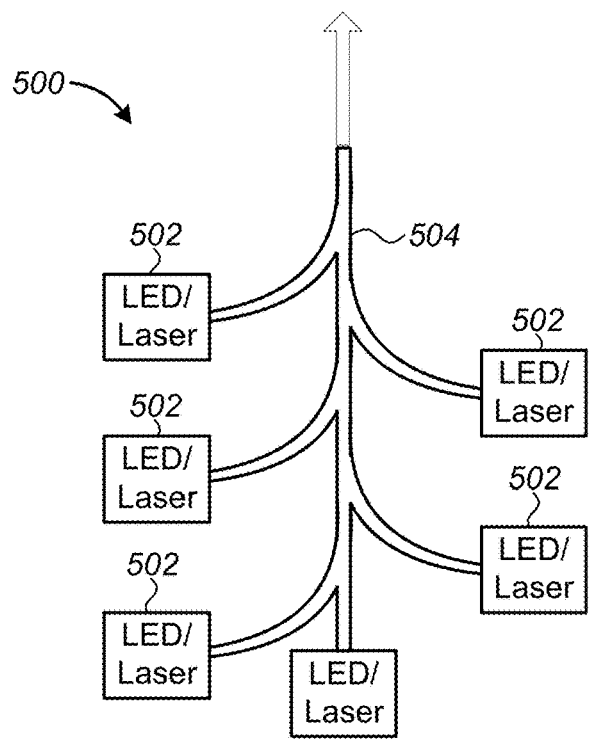
FIG. 5 is a block diagram depicting an embodiment of an illumination source according to another embodiment of the present disclosure and combining outputs of multiple, discrete emitters, each generating light at one or more different wavelengths.

FIG. 5 is a block diagram depicting another embodiment of an illumination source 500 combining outputs of multiple, discrete laser diodes 502, each generating light at one or more different wavelengths, and combined using optical fibers 504.

Figure 6:
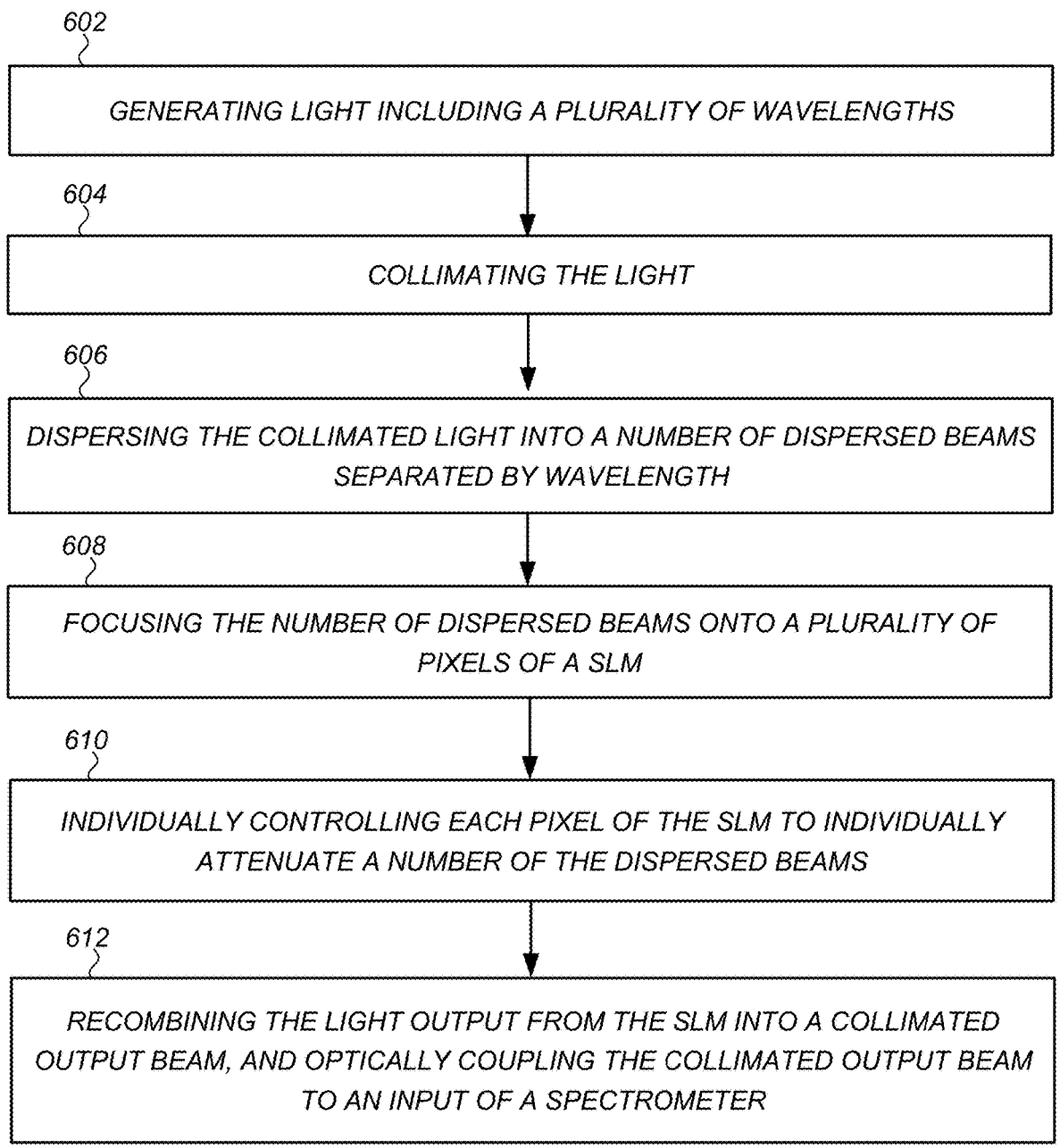
FIG. 6 is a flowchart of a method for spectral shaping light from a broadband source according to an embodiment of the present disclosure.

FIG. 6 is a flowchart of a method for spectral shaping light from a broadband source according to an embodiment of the present disclosure. Referring to FIG. 6 the method begins with generating light including a plurality of wavelengths (602). As noted above this can be accomplished using one or more broadband light sources, such as LEDs, or a supercontinuum laser. Next, the light is collimated (604) using, for example, an aspheric lens. Optionally, collimating the light may further include reducing the size or radius of the collimated light using, for example, an aperture as shown in FIGS. 3 and 4. The collimated light is then separated or dispersed into a number of dispersed beams separated by wavelengths (606) using a static, diffraction grating. The number of dispersed beams is then focused onto a plurality of pixels of a SLM, such as the LPLV described above (608). Each pixel of the SLM may then be individually controlled to individually attenuate at least a number of the dispersed beams by diffracting light output from the SLM into higher orders, wherein a diffraction angle of light output from the SLM is greater than an acceptance angle of light incident thereon (610). Finally, the light output from the SLM can be recombined into a collimated output beam, and optically coupling the collimated output beam to an input of a spectrometer (612).

The features and advantages of embodiments of the system and method of the present disclosure will now be described with reference to FIGS. 7 through 16, and tables shown below.

Figure 7:
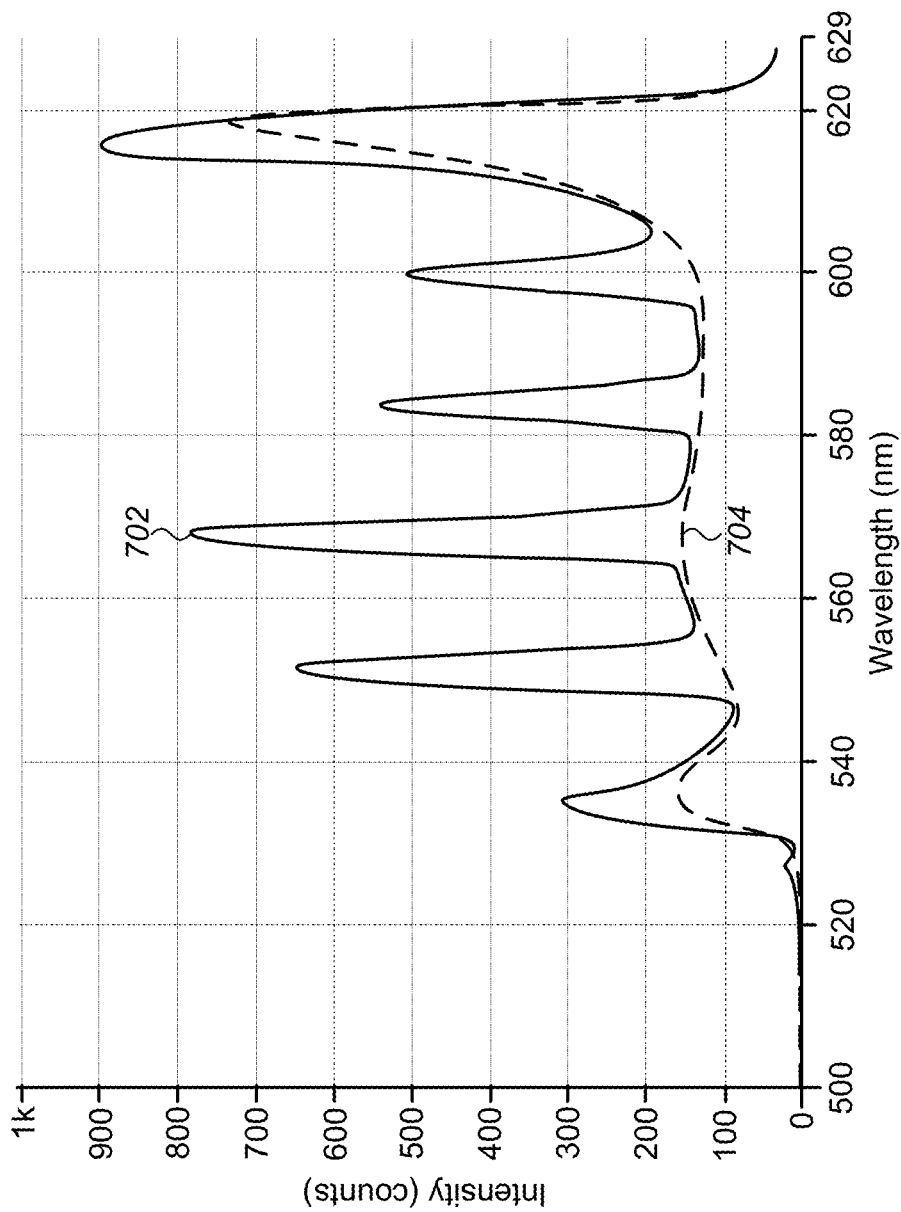
FIG. 7 is a plot of intensity versus wavelength for a spectral shaper according to an embodiment of the present disclosure and illustrating spectra detected and contrast ratios with 40 pixels on and 60 pixels off providing 6 peaks in intensity at different wavelengths.
Figure 8:
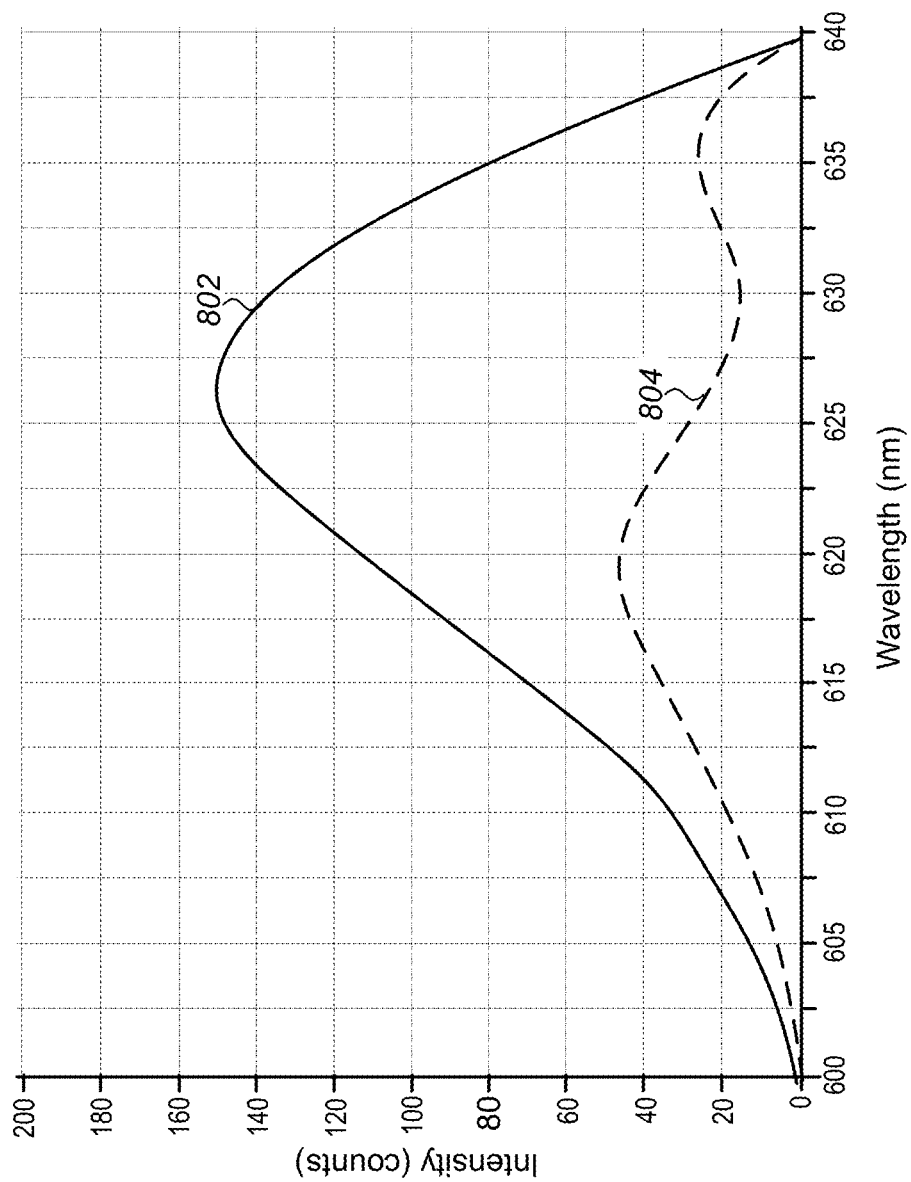
FIG. 8 is a plot of intensity versus wavelength for a spectral shaper according to another embodiment of the present disclosure and illustrating spectra detected and contrast ratios with all pixels on versus off.

FIGS. 7 and 8 are plots of intensity versus wavelength for a spectral shaper configured and operated according to different embodiments of the present disclosure and illustrating spectra detected and contrast ratios with pixels on and off in different patterns. The data for the plot of FIG. 7 was gathered using a system similar to that shown in FIGS. 3A and 3B having a broadband light source and a variable circular aperture to reduce the NA or acceptance angle $\theta_{in}$ to the linear SLM 302. The linear SLM 302 was illuminated across a substantially linear swath by near infrared (NIR) wavelengths from about 500 nanometers (nm) to about 630 nm, and driven or operated with a consistent pattern of 40 pixels on and 60 pixels off to yield the intensity output shown by a solid line 702 having 6 peaks measured using a spectrometer. Dashed line 704 represents a background signal leaking into a light path between the linear SLM 302 and the optics spectrometer 316. Referring to FIG. 7 it is noted that a maximum contrast ratio (CR) of 6.17, measured as difference between one of the 6 peaks and an adjacent minimum, occurs at wavelength of about 551.329 nm.

FIG. 8 is a plot of intensity versus wavelength for a spectral shaper according to another embodiment of the present disclosure where the input beam from a broadband illumination source 304 has a diameter of 2.5 mm and where all pixels are driven from one to off at the same level. The maximum intensity output is at each wavelength from about 600 to about 640 nm is shown by solid line 802 while the dashed line 804 represents a background signal arising from light leaking into the light path between the linear SLM 302 and the optics spectrometer 316. Referring to FIG. 8, it is noted that the contrast ratio (CR) varies from about 9:1 at wavelengths near about 628 nm to a maximum contrast ratio of about 14:1 near wavelengths of about 629 nm.

Figure 9:
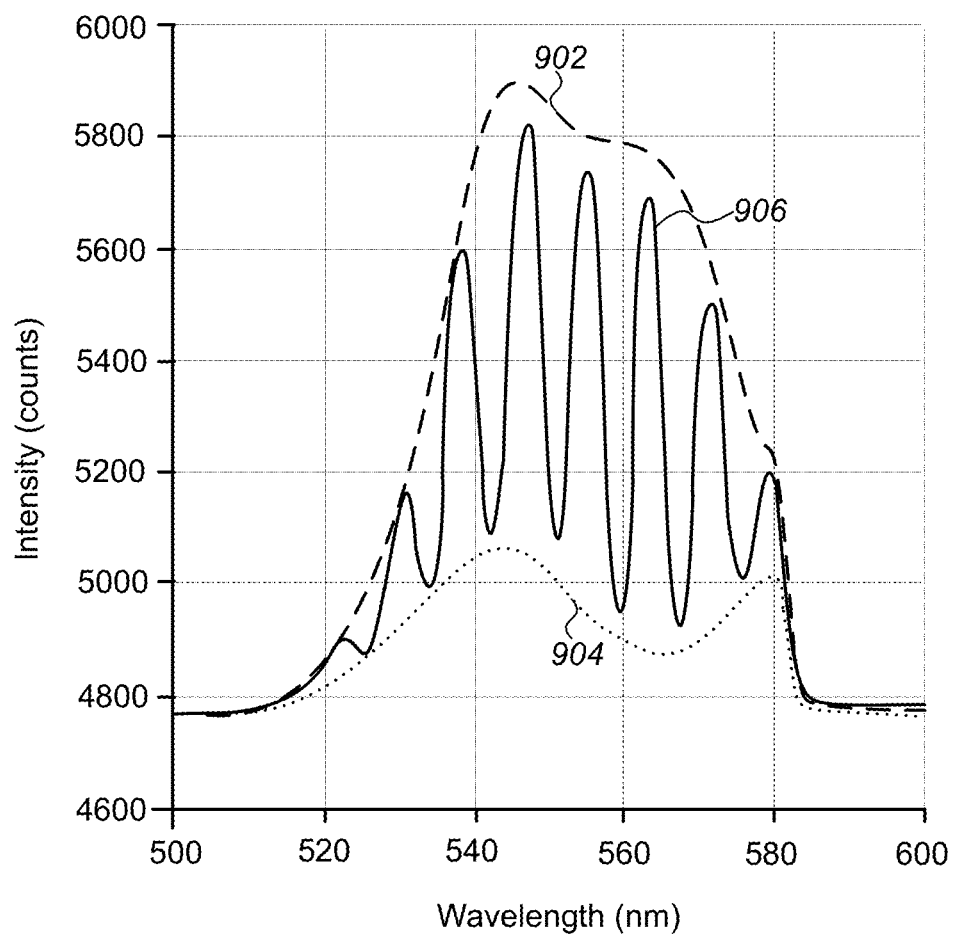
FIG. 9 is a plot of intensity versus wavelength for a spectral shaper according to embodiment of the present disclosure and illustrating spectra detected with three different pixel settings.

FIG. 9 is a plot of intensity versus wavelength for a spectral shaper according to embodiment of the present disclosure and illustrating spectra detected with three different pixel settings. Referring to FIG. 9, dashed line 902 represents intensity output versus wavelength where all pixels are in an on or reflecting state (full spectrum); dotted line 904 represents intensity output where all pixels are in the off or dark state; and dashed line 906 represents intensity output versus wavelength where alternating sets of pixels are in the on or the off state, illustrating the spectral resolution of the system.

Figure 10A:
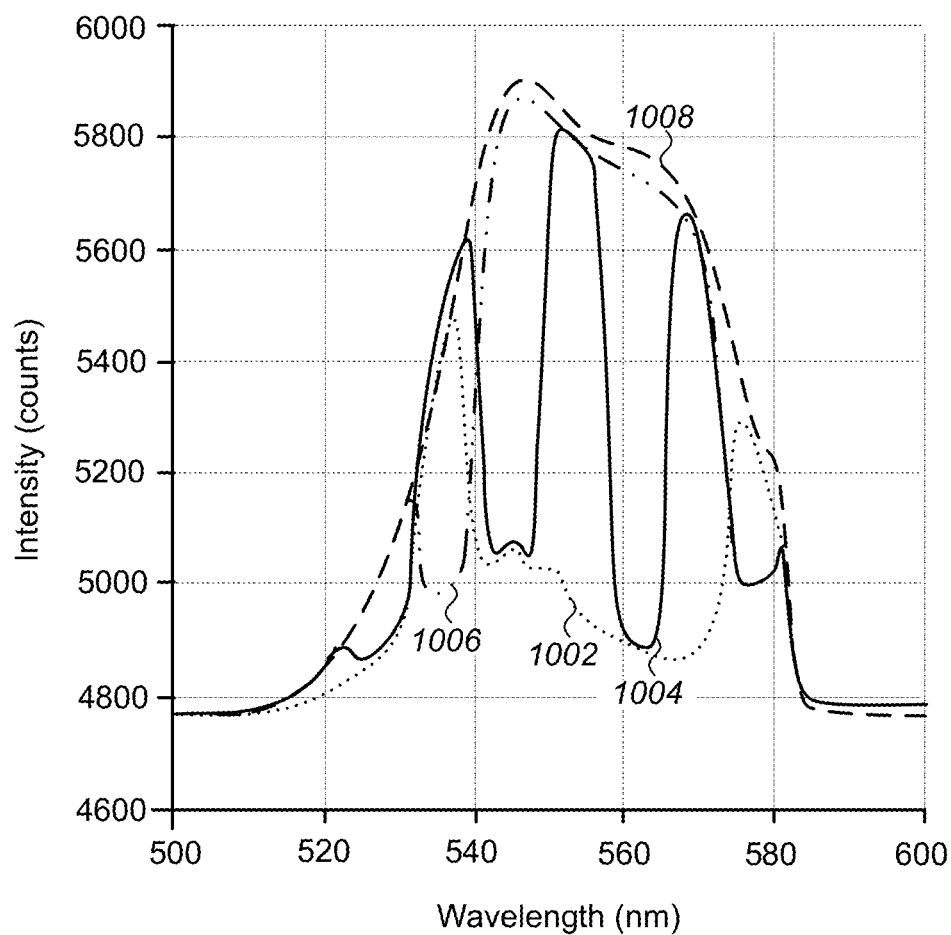
FIG. 10A is a plot of intensity versus wavelength for a spectral shaper according to another embodiment of the present disclosure and illustrating spectra detected with four different pixel settings.
Figure 10B:
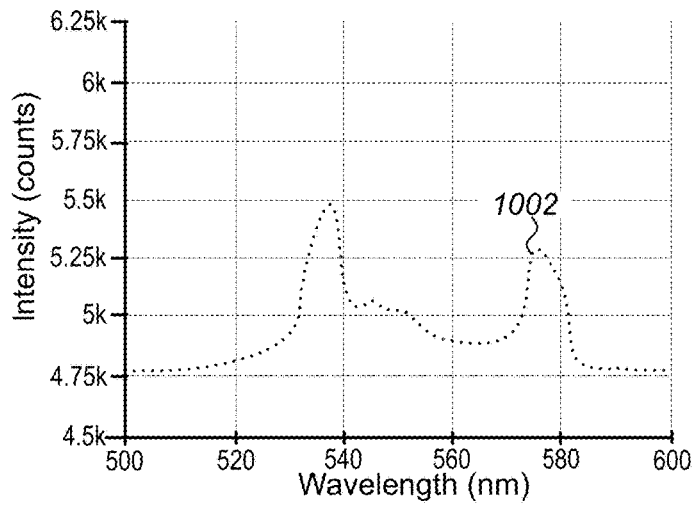
FIGS. 10B-10D show details of individual plots of for three of the pixel settings of FIG. 10A
Figure 10C:
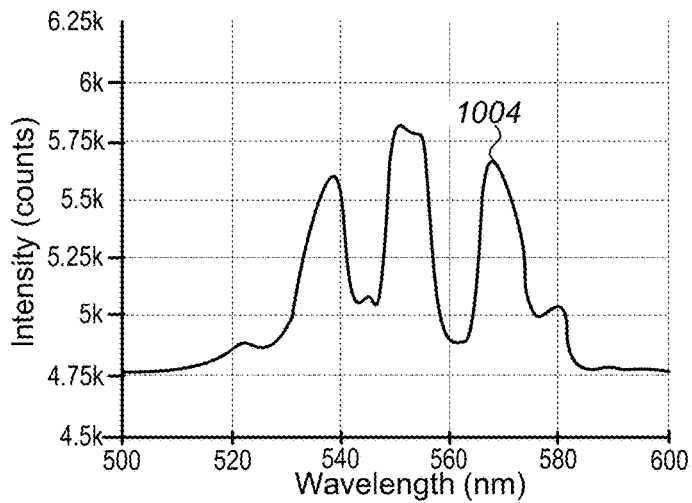
Figure 10D:
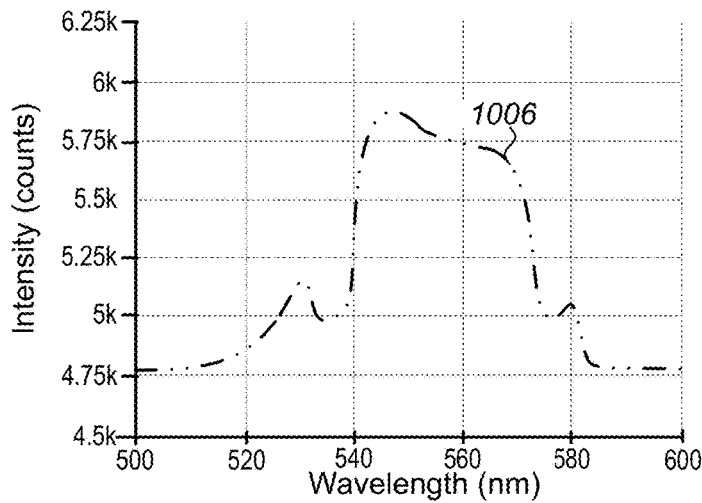

FIG. 10A is a plot of intensity versus wavelength for a spectral shaper according to another embodiment of the present disclosure and illustrating spectra detected with four different pixel settings. Referring to FIG. 10A dotted line 1002 represents the two end peaks at upper and lower wavelengths that can be modulated for a particular linear SLM used in gathering data for this plot. The solid line 1004 represents intensity output where alternating sets of pixels are in an on or off state. A dotted and dashed line 1006 represents the two end troughs at upper and lower wavelengths. Dashed line 1006 represents intensity output for the full spectrum or sum of the red, green, and blue lines. FIGS. 10B through 10D show individual plots of several of the single lines of FIG. 10A. In particular, FIG. 10B shows details of the dotted line 1002 representing the two end peaks. FIG. 10C shows details of the solid line 1004 representing intensity output for alternating sets of pixels are in a on or off state, and FIG. 10D shows details of the dotted and dashed line 1006 representing the two end troughs at upper and lower wavelengths.

Figure 11:
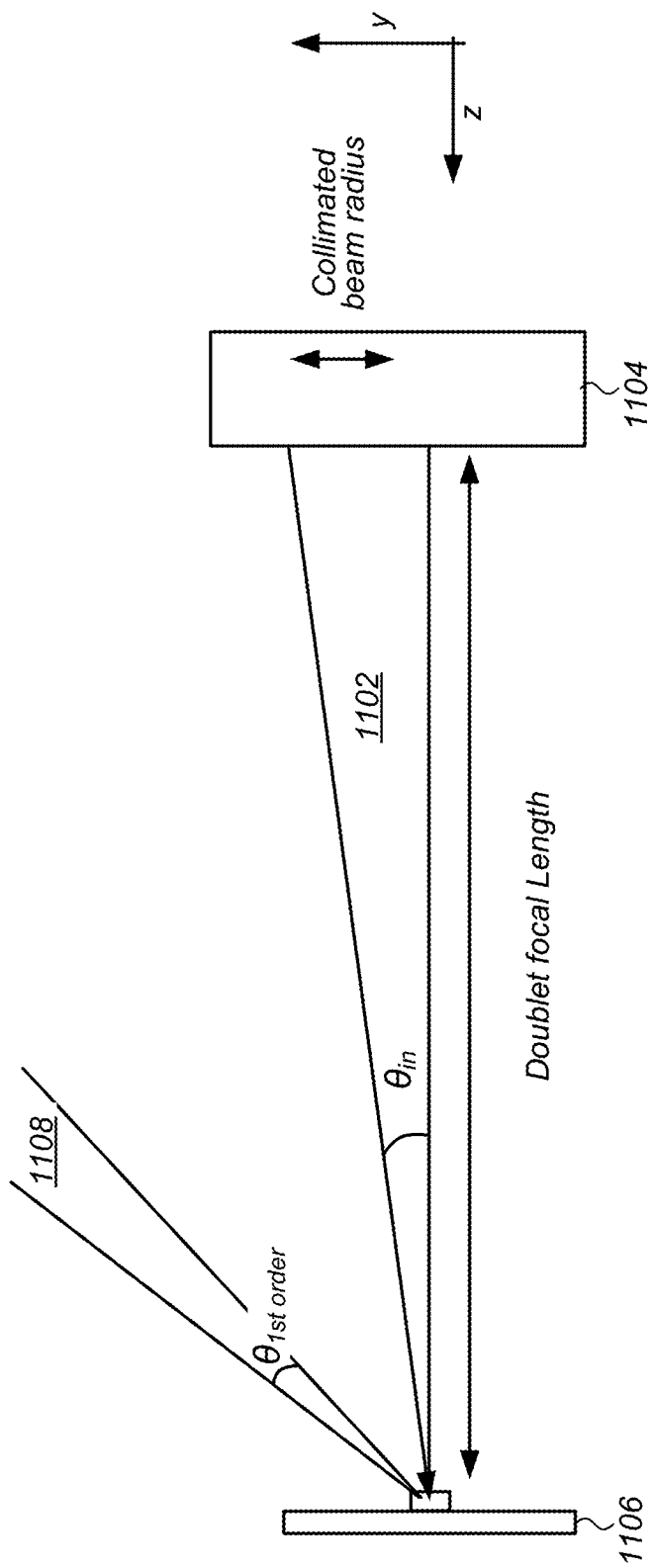
FIG. 11 is a block diagram depicting how the collimated beam is focused at angle $\theta_{in}$ to an SLM, which diffracts in the 1st order to $\theta_{1st}$, order from horizontal.
Figure 12:
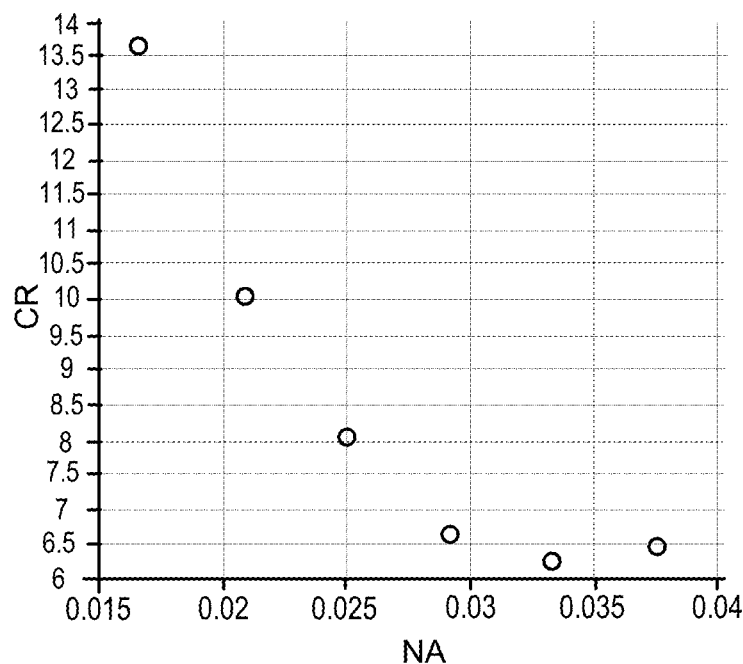
FIG. 12 depicts a plot of contrast ratio versus numerical aperture (NA) of incoming light for a spectral shaper according to an embodiment of the present disclosure and illustrating the dependence of contrast ratio on NA.

The contrast ratio for spectral shapers or systems using a conventional SLM with a broadband light source, such as an LED, has been found to be unacceptably low, i.e., a contrast ratio (CR) of less than about 3:1. However, as described herein by adding an aperture to reduce beam size, and therefore $\theta_{in}$, it has been found it is possible to significantly increase contrast ratio. FIGS. 11 and 12 show the dependence of contrast ratio on number aperture. FIG. 11 is a block diagram depicting how a collimated input beam 1102 from a focusing element 1104, such as an achromatic doublet lens, is focused at angle $\theta_{in}$ to a linear SLM 1106, which diffracts in the 1st order to yield an output beam $\theta_{1st}$ order with a cone of light 1108 entirely separate from that of the collimated input beam 1102.

FIG. 12 depicts a plot of contrast ratio versus numerical aperture (NA) of incoming light illustrating the dependence of contrast ratio on NA. Referring to FIG. 12, $\theta_{in}$ is changed by manually changing the NA of a variable aperture from 0.015 to 0.04, resulting in a change of $\theta_{in}$ as given by the equation below:

$$\theta_{in} = \frac{\text{radius aperture}}{f_{focusing\ lens}}$$

Referring to FIG. 12 it is seen that as the NA of the variable aperture is decreased from 0.04 to 0.015, the contrast ratio (CR) increases from about 6.5 to about 13.5.

Figure 13:
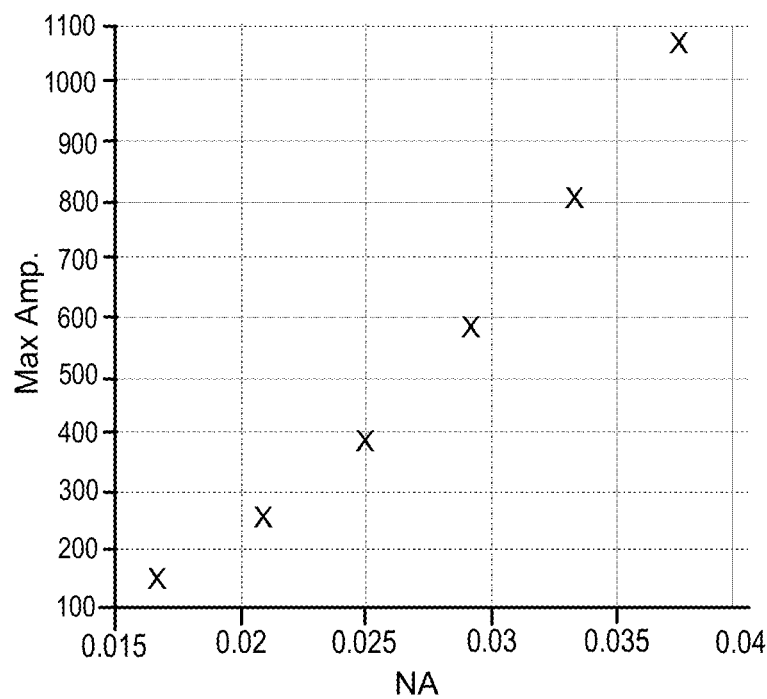
FIG. 13 depicts a plot of maximum output power versus NA of incoming light for a spectral shaper according to an embodiment of the present disclosure and illustrating the substantially dependence of output power on NA.

However, one consequence of the method of reducing aperture NA to increase the contrast ratio (CR) is that doing so linearly decreases the maximum output power. This is illustrated in FIG. 13, which depicts a plot of maximum output power (Max Amp.) versus NA of incoming light for a spectral shaper according to an embodiment of the present disclosure and illustrating the substantially dependence of output power on NA. Referring to FIG. 13 it is seen that as the NA of the variable aperture is decreased from about 0.04 to 0.015, the maximum output power (Max Amp.) is proportionally decreased from about 1100 amps to about 150 amps. Thus, the illumination source and the NA of the input aperture are selected in view of a desired maximum output power and contrast ratio (CR).

Thus, it has been found that a spectral shaper according to an embodiment of the present disclosure and including a broadband light source, and an aperture to aperture to reduce the NA or acceptance angle $\theta_{in}$ to a linear SLM diffractive SLM can reliably achieve contrast ratios of greater than 10:1, with a satisfactory optical transmission. It is believed lower NA at higher wavelengths illuminating a linear SLM diffractive SLM having a smaller pixel pitch will further increase contrast ratios and transmission powers.

Figure 16:
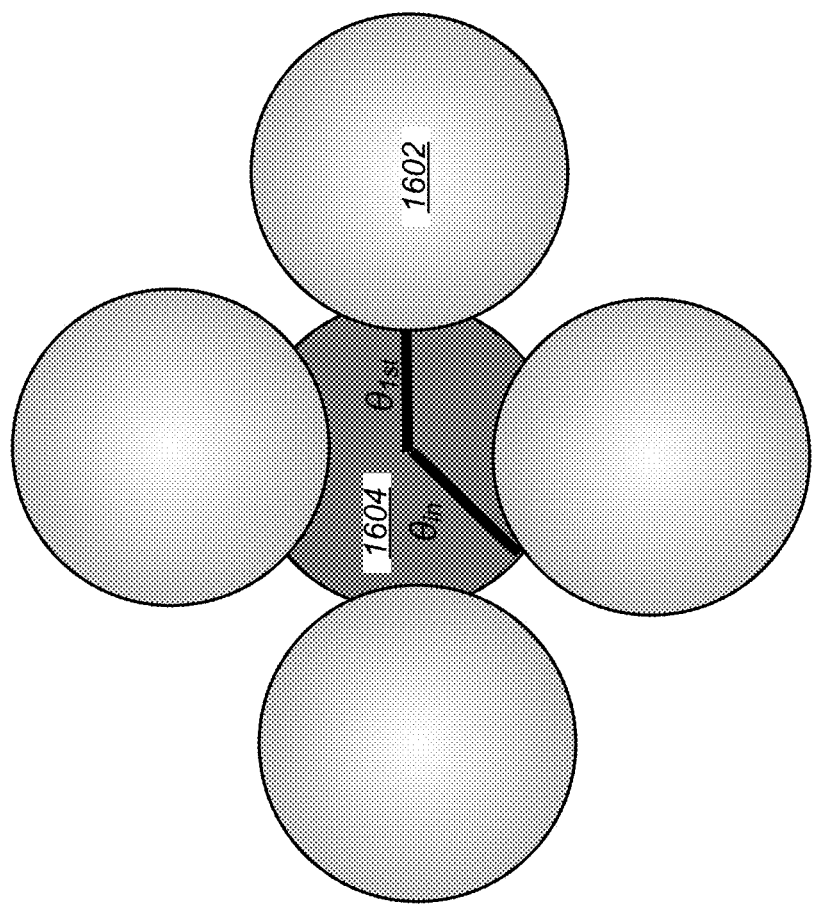
FIG. 16 is a schematic block diagram showing overlap between $0^{th}$ and $1^{st}$ orders from a SLM according to an embodiment of the present disclosure illuminated by a high NA beam.

FIGS. 14-16 schematically illustrate with block diagrams the effect of increasing incoming angle or angle of acceptance ($\theta_{in}$) on the angle of the first order of light out from the SLM or diffraction angle ($\theta_{1st\ order}$). It is noted that the block diagrams include only $0^{th}$ and $1^{st}$ order diffraction patterns, showing how the angle of the first order out from the SLM or diffraction angle ($\theta_{1st\ order}$) will remain constant at the same wavelength, while $\theta_{in}$ to the SLM is increased, thus resulting in a decreasing contrast ratio.

In particular, FIG. 14 shows complete separation between $0^{th}$ order beam 1402 and $1^{st}$ order beams out 1404 from the linear SLM when illuminated by a collimated beam or laser having a numerical aperture (NA) of approximately 0. FIG. 15 also shows a separation between $0^{th}$ 1502 and $1^{st}$ orders 1504 out from the linear SLM, although less than with the collimated beam of FIG. 14, when illuminated by a non-expanded beam having a NA of 0.006, and FIG. 16 shows an overlap between $0^{th}$ 1602 and $1^{st}$ orders 1604 out from the linear SLM between $0^{th}$ and $1^{st}$ orders when illuminated by a beam expanded to a radius of about 3 mm and having a NA of 0.02. It is seen that the numerical apertures of FIGS. 14 and 15 produce $1^{st}$ orders that can be easily isolated by an aperture or element in a light path out from the linear SLM, but the NA of FIG. 16 has too high to isolate the $0^{th}$ 1602 order from the $1^{st}$ orders 1604. It is further noted that the NA for FIG. 15 is near that of inexpensive, commercially available LEDs, and demonstrates why use of LED illumination sources was undesirable in prior art diffractive spectral shapers due to poor contrast ratios.

Further evidence of the impact of NA or angle of acceptance ($\theta_{in}$) to the linear SLM on contrast ratio is shown by the results in Table I below. Referring to Table I it is noted that the highest contrast ratios (separation between $1^{st}$ and $0^{th}$ orders out from the SLM) for a given wavelength (632 nm) are achieved with collimated beam or laser illuminating the SLM, but that satisfactory contrast ratios can be achieved with broadband light sources, when the NA or angle of acceptance ($\theta_{in}$) to the SLM is sufficiently low.

TABLE I

| $\lambda$, $\theta_{in}$ | Contrast Ratio | $\theta_{1st\ order}$ (radians) |
| --- | --- | --- |
| 632 nm, collimated | 95 | 0.026 |
| 632 nm, 0.003 | 40 | 0.026 |
| 632 nm, 0.04 | 7.5 | 0.026 |
| 543 nm, collimated | 105 | 0.023 |

In conclusion it has been found that reducing the incoming angle to the linear SLM has been shown to increase the contrast ratio when illuminated by an LED. It has further been found a similar increase contrast can be achieved if a pitch of the linear SLM grating were reduced or tightened. Finally, while the above improvements were realized using inexpensive, low power LEDs due to power handling capabilities of the linear SLM, a spectral shaper could be even more effective in applications using lasers.

Thus, a system and method for spectral shaping of a broadband source using two-dimensional Microelectromechanical systems based diffractive spatial light modulator have been disclosed. Embodiments of the present invention have been described above with the aid of functional and schematic block diagrams illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

It is to be understood that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

The breadth and scope of the present invention should not be limited by any of the above-described exemplary embodiments, but should be defined only in accordance with the following claims and their equivalents.

What is claimed is:

1. A spectral shaping system comprising:
   an illumination source generating light including a plurality of wavelengths;
   a collimating lens to receive light from the illumination source and transmit a collimated beam;
   an input aperture to receive and pass the collimated beam at a reduced width;
   an optical collecting element to receive and pass a portion of the collimated beam;
   a diffraction grating to receive the portion of the collimated beam from the optical collecting element and disperse the collimated beam into a number of dispersed beams separated by wavelength; and
   a focusing element to focus the number of dispersed beams from the diffraction grating onto a plurality of pixels of a linear spatial light modulator (SLM),
   wherein the linear SLM is configured to individually modulate the number of dispersed beams incident thereon by diffracting light output from the linear SLM into higher orders, and wherein a diffraction angle of light output from the linear SLM is greater than a full cone-angle of incoming light from the illumination source, wherein the focusing element is further configured to focus the light output from the linear SLM back onto the diffraction grating, and the diffraction grating is configured to recombine the light output from the SLM into a collimated output beam, wherein the diffraction grating is configured to disperse a $0^{th}$ order of light incident thereon, and wherein the focusing element comprises an optical element configured to collimate the $0^{th}$ order of the number of dispersed beams in a first direction, and focus the light in a second direction orthogonal to the first direction to spread the light linearly across the pixels of the linear SLM.

2. The spectral shaping system of claim 1 wherein the illumination source comprises broadband light sources such as light emitting diodes (LEDs).

3. The spectral shaping system of claim 1 wherein the illumination source comprises high power broadband laser sources of from hundreds of watts (W) to several kilowatts (kW) output power.

4. The spectral shaping system of claim 1 wherein the spatial light modulator is a linear arrangement of 2D diffractive modulators.

5. The spectral shaping system of claim 1 wherein the linear SLM is configured to individually modulate transmitted intensity of a number of the plurality of wavelengths.

6. The spectral shaping system of claim 1 further comprising a controller and a spectrometer configured to sample at least a portion of the collimated output beam and to generate data used by the controller to control the linear SLM.

7. The spectral shaping system of claim 6 further equipped for optical fiber output wherein entrance of the optical fiber is at a Fourier plane such that only a single diffraction order is accepted by the fiber and all other orders are blocked.

8. The spectral shaping system of claim 1 wherein the illumination source comprises a supercontinuum laser.

9. The spectral shaping system of claim 1 wherein the input aperture comprises a variable circular aperture to control a numerical aperture (NA) of light from the illumination source.

10. The spectral shaping system of claim 1 wherein the light-source comprises an intrinsically low numerical aperture (NA).

11. The spectral shaping system of claim 1 wherein the optical collecting element that directs light to and collects light from the diffraction grating comprises a beam splitter.

12. A method of spectrally shaping light comprising:
generating light including a plurality of wavelengths;
collimating the light;
dispersing the collimated light into a number of dispersed beams separated by wavelength by passing the collimated light through a diffraction grating;
focusing a $0^{th}$ order of the number of dispersed beams from the diffraction grating in a first direction, and focus the light in a second direction orthogonal to the first direction onto a plurality of pixels of a linear spatial light modulator (SLM) to spread the light linearly across the pixels of the linear SLM; and
individually controlling each pixel of the linear SLM to individually modulate a number of the dispersed beams separated by wavelength by diffracting light output from the linear SLM into higher orders,
wherein a diffraction angle of light output from the linear SLM is greater than a cone-angle of the incoming light from the illumination source.

13. The method of claim 12 wherein the linear SLM comprises a large optical area that enables spectrally shaping of light output from the linear SLM to be accomplished using low coherence broadband light sources including one or more light emitting diode (LEDs) optically coupled together.

14. The method of claim 12 wherein the linear SLM comprises a large optical area that enables spectrally shaping of light output from the linear SLM to be accomplished using high power broadband laser sources, such as supercontinuum lasers, from one watt (W) to over a kilowatt (kW) output power.

15. The method of claim 12 further comprising recombining the light output from the linear SLM into a collimated output beam.

16. The method of claim 15 wherein recombining the light output from the linear SLM into a collimated output beam comprises passing the light back through the diffraction grating.

17. The method of claim 12 further comprising sampling a portion of the collimated output beam using a spectrometer, and controlling the linear SLM using a controller receiving data from the spectrometer.

18. The method of claim 12 wherein individually modulating the number of the dispersed beams further comprises individually modulating a transmitted intensity the number of the dispersed beams.

19. A spectral shaper comprising:
a diffraction grating configured to receive a collimated beam including a plurality of wavelengths from an illumination source, and to disperse the collimated beam into a number of dispersed beams separated by wavelength; and
a focusing element to focus a $0^{th}$ order of the number of dispersed beams from the diffraction grating in a first direction, and focus the light in a second direction orthogonal to the first direction onto a plurality of pixels of a linear spatial light modulator (SLM) to spread the light linearly across the pixels of the linear SLM,
wherein the linear SLM is configured to individually modulate the number of dispersed beams incident thereon by individually modulating a transmitted intensity the number of the dispersed beams, and by diffracting light output from the linear SLM into higher orders, wherein a diffraction angle of light output from the linear SLM is greater than the full cone-angle of the incoming light from the illumination source.

20. The spectral shaper of claim 19 wherein each of the plurality of pixels of the linear SLM comprises one or more two dimensional (2D) microelectromechanical systems (MEMS) based diffractive modulators.

* * * * *